(12) United States Patent
Turena et al.

(10) Patent No.: US 12,294,222 B2
(45) Date of Patent: May 6, 2025

(54) CIRCUIT AND METHOD FOR BALANCING ENERGY MANAGEMENT OVER TIME

(71) Applicant: Ceska Energeticko-Auditorska Spolecnost, S.R.O., Prague (CZ)

(72) Inventors: Milan Turena, Dasice (CZ); Ludvik Dolecek, Dasice (CZ)

(73) Assignee: Ceska Energeticko-Auditorska Spolecnost S.R.O., Prague (CZ)

( * ) Notice: Subject to any disclaimer, the term of this patent is extended or adjusted under 35 U.S.C. 154(b) by 491 days.

(21) Appl. No.: 17/911,630

(22) PCT Filed: Mar. 13, 2021

(86) PCT No.: PCT/CZ2021/050029
§ 371 (c)(1),
(2) Date: Sep. 14, 2022

(87) PCT Pub. No.: WO2021/185393
PCT Pub. Date: Sep. 23, 2021

(65) Prior Publication Data
US 2023/0318309 A1 Oct. 5, 2023

(30) Foreign Application Priority Data
Mar. 14, 2020 (CZ) .............................. PV 2020-140

(51) Int. Cl.
*H02J 3/46* (2006.01)
*G06N 3/045* (2023.01)
*G06N 3/084* (2023.01)

(52) U.S. Cl.
CPC ...................................... *H02J 3/46* (2013.01)

(58) Field of Classification Search
CPC ..................... G06N 3/084; G06N 3/045; G06F 2009/45595
See application file for complete search history.

(56) References Cited

U.S. PATENT DOCUMENTS

| | | | |
|---|---|---|---|
| 2016/0012004 A1* | 1/2016 | Arimilli | G06F 13/4221 |
| | | | 710/306 |
| 2016/0154040 A1 | 6/2016 | Driscoll et al. | |

(Continued)

OTHER PUBLICATIONS

International Search Report—PCT/CZ2021/050029—Jul. 2, 2021.
Written Opinion—PCT/CZ2021/050029—Jul. 2, 2021.

*Primary Examiner* — Jermele M Hollington
*Assistant Examiner* — Temilade S Rhodes-Vivour
(74) *Attorney, Agent, or Firm* — Krishna Kalidindi

(57) ABSTRACT

The circuit comprises a computing center and at least three connection points (S.k) managing energy equipped with measuring devices (A.k), data-interconnected to the computing center. All connection points (S.k) are power-interconnected to the distribution network. The circuit comprises at least three logical control nodes (N.i.j) in a logically interconnected tree structure, wherein they are divided into at least two levels. The logical interconnection structure comprises at least one branching with at least two branches between logical control nodes (N.2.j) of the second level and the connection points (S.k). Each logical control node (N.i.j) is a part of the computing center which comprises processors, among which at least one real processor exists which is divided into at least two virtual processors. Each of the logical control nodes is assigned one of these virtual or real processors, and the logical interconnection between the logical control nodes (N.i.j) is implemented as a logical interconnection between their assigned processors. A method is also proposed for balancing energy management over time by utilizing this circuit.

11 Claims, 4 Drawing Sheets

(56) References Cited

U.S. PATENT DOCUMENTS

| | | |
|---|---|---|
| 2016/0248255 A1 | 8/2016 | Rive et al. |
| 2019/0042388 A1* | 2/2019 | Wang .................... G06F 12/084 |
| 2019/0109891 A1* | 4/2019 | Paruchuri .............. G06Q 50/06 |

* cited by examiner

CIRCUIT AND METHOD FOR BALANCING ENERGY MANAGEMENT OVER TIME

TECHNICAL FIELD

The invention relates to the so-called smart grids which allow to regulate the production and consumption of electrical energy in real time.

BACKGROUND ART

At present, renewable energy sources are undergoing a great development, which are, however, characterized by irregular production over time. The energy consumption of households and industrial enterprises is also irregular over time, whereas energy storage capacities are far from sufficient to compensate these fluctuations. The usual situation is that to a distribution network comprising large power plants, such as nuclear, thermal or hydro, connection points are power-connected that may themselves comprise some other smaller energy source, such as solar panels, windmills, etc., and/or can consume and/or store energy. At a time when the energy balance, i.e. the difference between the energy produced and the sum of energy consumed and stored of such connection point is non-zero, this needs to be addressed either by transferring excess energy into the distribution network or by drawing missing energy from the distribution network. Both conditions are disadvantageous for the owner of the connection point, in the first case causing financial sanction by the distribution network operator for the transferred excess energy.

To balance momentary consumption of electricity over time, for example, a method according to the patent document CZ 305568 was proposed, in which the predicted consumption of electricity consumed from the transmission and distribution network and the predicted production of electricity supplied to this network are monitored. As shown, for example, in FIG. 3 in this document, the consumption points with smart meters and power plants with smart meters are star-connected to the smart grid, which is also connected to the control unit. Data from the smart meters are sent to the control unit at intervals of less than 15 minutes. Based on the difference between the found values of predicted consumption and production, the expected surplus of the produced quantity of electricity for the following period of time is calculated. If a surplus is identified, an offer of electricity at a reduced price is sent from the control unit to the smart meters connected to the given distribution network to reduce the surplus, followed by another recalculation and confirmation or non-confirmation of this price offer to the relevant consumption points. The disadvantage of this and other similar solutions is that data on energy production or consumption at a given connection point are sent to the control unit individually for each individual connection point and with larger number of connection points the calculation of the system energy balance is lengthy, so it does not allow energy balance determination in time intervals significantly shorter than 15 minutes. Concurrently, there is now pressure from distribution network operators to achieve a balanced energy balance at incomparably shorter intervals, typically 1 s. The requirement to achieve an energy balance within 1 s is based in the Czech Republic on the Energy Act and a written regulation of the Energy Regulatory Office.

Achieving a balanced energy balance in such a short time with a star-shaped data interconnection of the connection points with a central control unit is not possible with normal computing power. Patent file CZ 305568 also addresses the consequences of energy balance imbalance by offering a change in the tariff, which should lead to a change in consumption behavior of users of connection points, but, however, does not address the causes of this imbalance at source, i.e. at the location where energy is produced and where the imbalance of energy balance is possible to be addressed by purely technical means.

SUMMARY OF INVENTION

These shortcomings are overcome by the circuit and method for balancing energy management over time according to the present invention. Owing to the proposed logical interconnection of logical control nodes and connection points, it is possible to radically reduce the time required for the calculation of the total energy balance, up to less than 1 s. Owing to this, it is possible, for example, to minimize or completely eliminate the transfer of energy overflows into the distribution system.

Circuit for balancing energy management over time comprises a computing center and at least three connection points where energy is managed. Each of these connection points is equipped with a measuring device for measuring energy management data over time, which is data-connected to the computing center comprising at least one processor. An energy production source is included in at least one of the connection points and an energy consuming appliance is included in at least one of the connection points. All connection points are also connected to the distribution network. The circuit comprises at least three logical control nodes, which are arranged in a logically interconnected tree structure, in which they are divided into at least two levels, wherein the levels are numbered by the first sequential numbers i from 1 to m, where m is the total number levels. Within the same level with the same first sequential number i, the logical control nodes are numbered by the second sequential number j. The logically interconnected tree structure is arranged so that in the lowest first level there is one central logical control node from which the tree structure branches to higher levels, wherein the first level sequential number increases in the direction from the said central control node, and each logical control node of the highest m-th level is logically interconnected to at least one of the connection points, the logical connection structure comprising at least one branching with at least two branches between the logical control nodes of the second level and the connection points. The principle of this circuit is that each logical control node is a part of the computing center and that among the processors of the computing center there is at least one real processor having at least two cores and which is divided at least into two virtual processors, with each of them having at least one core. The sum of the number of the real processors not divided into virtual ones and of the number of the virtual processors is equal to or greater than the total number of logical control nodes of all levels. Each of the logical control nodes is assigned one of these virtual or real processors, and the logical connection between the logical control nodes is implemented as a logical connection between the individual processors assigned to these logical control nodes.

It is advantageous if for at least one real processor which is divided into two or more virtual processors, the number of cores of the divided real processor is equal to the sum of the number of cores of the virtual processors created from this real processor.

It is advantageous if from each logical control node of levels 1 to m−1 emerge at least two branches of logical interconnection towards the logical control nodes of the closest higher level and if also from each logical control node of the highest level m emerge at least two branches towards the connection points.

It is advantageous if the number of connection points is greater than the number of logical control nodes of the highest m-th level. The connection points are divided into groups according to geographical zones and/or the nature of energy management so that the number of these groups of connection points corresponds to the number of logical control nodes of the highest m-th level and each group of connection points is assigned one logical control node of the highest m-th level, to which the connection points of the given group are logically connected.

In some possible embodiments, the measuring device of at least one of the connection points is connected to the computing center via the Internet.

An embodiment is possible in which each connection point comprises at least one energy production source and/or at least one energy consuming appliance and/or at least one energy storage.

The method of balancing energy management over time comprises the following steps:
a) selecting of at least three connection points so that at least one of them comprises an energy production source and that at least one of them comprises an energy consuming appliance, dividing these connection points into at least two groups and connecting all these connection points to the distribution network,
b) equipping the computing center with at least one processor, wherein all the computing center processors have in total at least three cores and at least one of the computing center processors has at least two cores, and its principle is that it further comprises the following steps:
c) dividing at least one real processor in the computing center having at least two cores, into at least two virtual processors, each of which having at least one core,
d) determining the number of logical control nodes, this number being greater than or equal to 3 and less than or equal to the sum of the cores of all processors in the computing center, and determining the number m of logical control nodes levels, wherein m$>=$2,
e) assigning one real or one virtual processor to each logical control node,
f) for each group of connection points the step of logically interconnecting the connection points from this group to one of the logical control nodes of the highest level m so that the connection points from each group of connection points are logically interconnected to other control nodes of the highest level m than connection points assigned to the other groups,
g) logically interconnecting the logical control nodes implemented as real or virtual processors from the highest level m to the central logical control node of level 1 in such way that each logical control node of higher level is connected to one of the nodes of one level lower, whereas steps a) to g) are performed in such manner, that in the logical interconnection between the logical control nodes of the second level and the connection points, at least one branching with at least two branches is present.

It is advantageous, if for each level i of the logical control nodes, based on the computing power of those processors assigned to the logical control nodes of this level i, a determination is performed of the maximum allowed number of logical connections $Nmax_i$ oriented upwards from each logical control node of this level i to the elements of the next higher level. Wherein the elements of the next higher level concurrently comprise for levels 1 to m−1 the logical control nodes and for level m comprise the connection points. When performing step a), after dividing the connection points into groups, it is verified whether the number of connection points in any group is greater than the maximum allowed number $Nmax_m$ of upward oriented logical connections for the logical control nodes of highest level m, and if yes, the distribution of connection points into groups is changed, or additional logical control nodes and/or levels are added so that the condition for the maximum allowed number $Nmax_i$ of logical interconnections oriented upwards from one logical control node at each level is satisfied, whereas each of the added logical control nodes is assigned one virtual or real processor, not yet assigned to any logical control node, and if the number of such virtual or real processors in the computing center is not sufficient, they are supplemented by adding real processors to the computing center and/or by dividing real processors into virtual processors.

It is advantageous to perform the following steps after step d):
h1) at any time prior to the following steps h2) to h3) or at any time during their carrying out, determining or adjusting the measuring intervals and calculation intervals and determining or adjusting the maximum permitted total energy balance for the set of all selected connection points, wherein the energy balance means the difference between the produced energy and the sum of energy consumed and energy stored for the specified calculation interval,
h2) measuring of energy management at the level of each connection point, wherein this measuring comprises determining the current level of consumption and/or of production and/or of energy storage and/or determining the status of the energy storage system within the connection point and performing it continuously or at the predetermined measurement intervals, and calculating the total energy balance at the specified calculation intervals gradually from the highest level m of logical control nodes to the central logical control node, so that firstly, for each logical control node of the highest level m, the total energy balance of logically connected connection points is calculated on the basis of the measured data on energy management for these connection points and subsequently also for each level i of the logical control nodes from the second highest m−1 level down to the lowest first level, in each level also for each logical control node of this level i, the total energy balance is calculated for logical control nodes of the next higher level that are logically connected to this node of lower level i,
h3) verifying whether the total energy balance calculated in step h2) for the central logical control node N.1.1 is negative:
if yes, verifying whether any energy production sources are operating in an dampened mode at connection points S.k, if yes, the computing center issues an instruction to increase the power of at least one of them, after which steps h2) and h3) are repeated, if not, the computing center issues instruction to draw energy from the distribution network, after which steps h2) and h3) are repeated,
if not, a verification is performed if it is lower than or equal to the maximum permitted total energy balance, if yes, steps h2) and h3) are repeated, if not, the computing center issues an instruction to reduce production in at least one of the energy production sources and then steps h2) and h3) are repeated.

If a negative energy balance is found for the central logical control node in step h2) and at the same time no energy sources operating in a dampened mode are found among the connection points, the computing center will usually issue an instruction to draw energy from the distribution network.

It is advantageous, if the computing intervals are set to less than or equal to 1 s.

It is also advantageous it the area in which the connection points are located is divided into geographical zones and the dividing of the connection points into groups in step a) is carried out in such manner, that each group of connection points comprises places located in one geographical zone.

Circuit and method conceived in this way will prevent overloading of the distribution network, ensure the balance of the respective energy management area and also ensure maximum energy security through decentralization. Further advantages of the present invention will be apparent from the following embodiment examples.

BRIEF DESCRIPTION OF DRAWINGS

Examples of embodiments of the invention are provided in the attached figures.

In FIG. 1, the connection points S.k are marked with an oval and by a space-saving circle in FIGS. 2a to 2d, since the measuring devices A.k are not depicted.

FIGS. 2a to 2d depict, respectively, the first to fourth logical interconnection steps for the depicted number of connection points and logical control nodes, i.e. for one exemplary example of the conditions imposed for establishing the logical interconnection, to be explained below.

DESCRIPTION OF EMBODIMENTS

The advantageous embodiments described below illustrate only some of the many possible solutions which fall within the scope of the invention and illustrate the inventive idea. These are only selected advantageous embodiments not limiting the scope of protection of the invention in any way.

Figure 1:
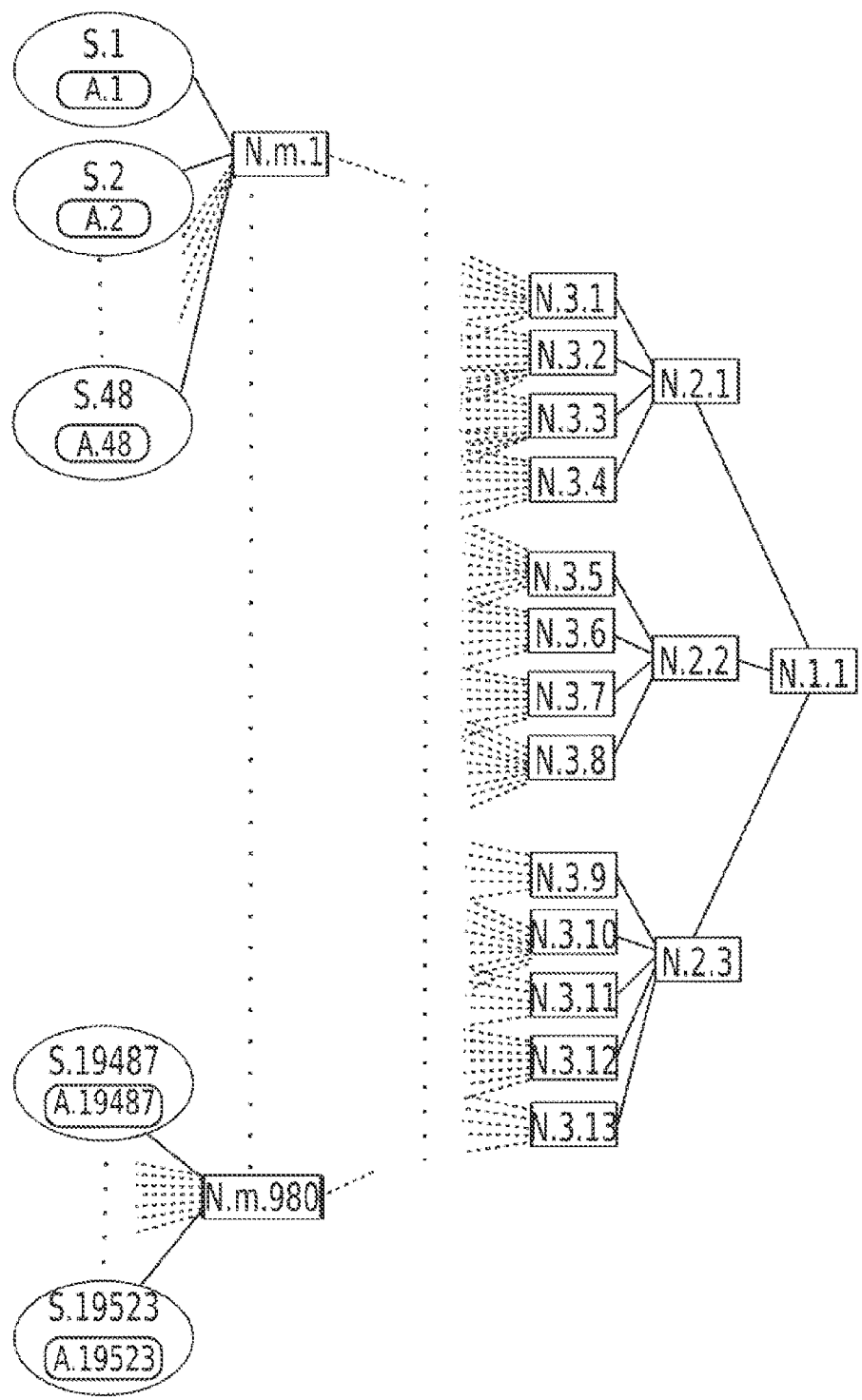
FIG. 1 depicts one of the many possible embodiments of the circuit for balancing energy management over time. In other embodiments, the number of the logical control nodes N.i.j. overall and also the number of logical control nodes in individual levels may differ from this example, similarly, of course, the number of connection points S.k may be different. The number of such possible embodiments is great. For the sake of simplicity, the figure does not show the connection of the connection points S.k to the distribution network or the computing center.

FIG. 1 depicts one specific possible example of a circuit for balancing energy management over time. The circuit comprises a computing center, not shown in FIG. 1 for simplicity. Part of this computing center are the logical control nodes generally marked N.i.j. The use of these logical control nodes is the most important new feature allowing to achieve one of the main technical effects of the invention, i.e. faster calculation of energy balance than is possible in solutions known from background art with a similar computing power of the computing center and a similar number of connection points S.k.

The levels of the logical control nodes are numbered by first sequential numbers i from 1 to m, where m is the total number of levels, whereas in the same level with the same first sequential number i, the logical control nodes N.i.j are numbered by second sequential number j.

The first level always comprises one central logical control node N.1.1, from which a tree structure emerges, typically via additional levels of logical control nodes towards the connection points S.k, which are logically interconnected to the logical control nodes N.m.j of the highest level m. In the example in FIG. 1, there are three logical control nodes N.2.1, N.2.2, N.2.3 on the second level, then on the third level, 13 logical control nodes N.3.1 to N.3.13, subsequently the number of branches is too large to be depicted, and the continuation of the circuit is only indicated by dashed lines and dotted lines. In the indicated part, the circuit continues in the same way, from each logical control node of level 3 emerge logical interconnections to one or typically more logical control nodes of level 4, etc. up to the highest level of logical control nodes m, part of which is again drawn in more detail in FIG. 1.

The connection points where energy is managed can be seen, which we generally denote S.k, where k is the sequential number of the connection point, each of which is equipped with a measuring device A.k for measuring data on energy management over time. Each measuring device A.k is data-connected to the computing center. At least one of the connection points S.k comprises a production source of energy and at least one of the connection points S.k comprises an energy consuming appliance, being within the same connection point, or the production source may be part of a different connection point than the appliance. And of course, the most common variant will be a combination of variously configured connection points, some of which comprise only the energy production source or sources, others only appliances, still others comprising both production sources and appliances, all this possibly in a combination with energy storage, etc. By production source of energy, we mean such source that produces electric energy, i.e. for example a solar panel or a power plant or any renewable or non-renewable source of electric energy, i.e. for example sources producing electricity from wind, water, biogas, fossil and other fuels. All connection points S.k are also power connected to the distribution network, which is not shown in FIG. 1.

The distribution network to which the connection points S.k are connected can be local, e.g. at a location with several connection points (typically family houses), which are connected to one transformer station. This transformer station is then connected to a superordinate and usually larger distribution network. The connection points S.k can also be connected to a local distribution network e.g. within one industrial production area, whereas this local distribution network is again usually connected to a superior and usually larger distribution network. However, the connection points S.k can also be connected directly to this larger distribution network.

In an advantageous embodiment, the measuring device A.k of at least one of the connection points S.k can be connected to the computing center via the Internet.

Aside from the above-mentioned condition necessary to achieve a balanced energy balance, namely that the connection points S.k included in the circuit must comprise at least one energy production source and at least one energy consuming appliance, the structure of the connection points can be very diverse. In general, each connection point S.k comprises at least one energy production source and/or at least one energy consuming appliance and/or at least one energy storage, i.e. among the connection points there can be the individual energy production sources or their combinations, as well as individual appliances or combinations thereof, as well as, for example, battery storages in combination with the previous elements or separately. One connection point may also comprise a combination of these devices, i.e. it may comprise at the same time a source or sources of energy, an appliance or appliances and a storage, or any combination selected from this group of devices. The connection points of S.k include, for example, a household with electrical appliances, a household equipped with a renewable energy source and/or battery storage, a production plant with electrical appliances, or a production plant with renewable energy sources and/or battery storage, electric vehicle charging stations, again optionally supplemented by e.g. a solar panel or other device, and many more.

FIG. 1 depicts an example, in which to the first logical control node N.m.1 of the highest level m, 48 connection points S.1 to S.48 are connected, the subsequent logical control nodes are only indicated and only the last logical control node is drawn in more detail, in this example having the sequential number 980 with connected connection points S.19487 to S.19523. All numbers as well as all examples of logical interconnection branchings are selected as an example only, and to better illustrate the invention.

In order to demonstrate the technical effect of the invention, it is necessary that the circuit comprises at least three connection points S.k, where energy is managed, but the effect, of course, increases with the higher number of connection points. It is possible to connect entire cities or regions.

It is essential that the circuit comprises at least three logical control nodes N.i.j, which are arranged in a logically interconnected tree structure in which they are divided into at least two levels, i.e. comprising at least the central control logic node N.1.1 and at least two nodes N.2.1, N.2.2 of the second level. In general, the logically interconnected tree structure is arranged so that in the lowest first level there is one central logical control node N.1.1, from which the tree structure branches to higher levels, while the first sequential number corresponding to a level increases in the direction from this central control node N.1.1. Each logical control node N.m.j the highest m-th level is logically interconnected to at least one of the connection points S.k. In order to speed up the calculation, the logical interconnection structure should comprise between the logical control nodes N.2.j of the second level and the connection points S.k at least one branching with at least two branches. This means that, for example, a variant with only two logical control nodes of the 2nd level, with two connection points S.1, S.2 connected to one logical control node and one connection point S.3 connected to the other. Already this variant speeds up the calculation of the energy balance, but of course, the circuit also allows a significantly larger number of connection points, for which a larger number of branchings of the logical interconnection along the route between connection points S.k and the central control node N.1.1 is advantageous, as shown e.g. in FIG. 1.

It is advantageous if from each logical control node N.i.j of levels from 1 to m−1 at least two branches of the logical interconnection emerge towards the logical control nodes of the nearest higher level and when also at least two branches of the logical interconnection emerge from each of the logical control nodes of the highest level m towards connection points S.k. One such example with exactly two branches of the logical interconnection towards the nearest higher-level nodes and also towards the connection points S.k can be seen in the example in FIG. 2b. Here, exactly two branches of the logical interconnection to the second level logical control nodes emerge from the central logical control node N.1.1. From each of the logical control nodes N.2.1 and N.2.2 of the second level, then also two branches of the logical interconnection emerge towards the connection points.

The number of connection points S.k is in an advantageous embodiment greater than the number of the logical control nodes N.m.j of the highest m-th level and the connection points S.k are usually divided into groups according to geographical zones and/or the nature of energy management in such manner, that the number of these groups of connection points S.k corresponds to the number of logical control nodes N.m.j of the highest m-th level and each group of connection points S.k is assigned one logical control node N.m.j of the highest m-th level, to which the connection points S.k of the given group are logically connected.

A geographical zone can be, for example, an individual house, a district, a city or even a larger entity; the nature of energy management means how a given connection point consumes and/or produces and/or stores energy over time. It is advantageous to group such connection points, at least some of which have an inverse character of energy management for at least part of the operating time, i.e. that, for example, while the solar source has a production peak at one connection point in a certain part of the day, an appliance or appliances at another connection point of the same group have the highest consumption in a similar part of the day, typically e.g. a production plant.

Each logical control node N.i.j is a part of the computing center.

In particular, it is advantageous if at least some of the logical control nodes N.i.j are virtual and are stored in a memory block of the computing center.

The data center typically comprises processors. These processors can be real and/or at least one of the real processors is divided into at least two virtual processors, which is advantageous for streamlining the calculation. The sum of the number of real processors not divided into virtual ones and the number of virtual processors is equal to or greater than the total number of all logical control nodes N.i.j of all levels, because it is suitable to have some real processors as a backup or the possibility of dividing real processors into virtual ones in case the circuit is expanded to comprise additional connecting points S.k. Each of the logical control nodes N.i.j is assigned exactly one of these virtual or real processors, and the logical interconnection between the logical control nodes N.i.j is implemented as a logical interconnection between the individual processors assigned to these logical control nodes N.i.j.

However, the computing center may also be arranged in another way, for example, to each of the logical control nodes N.i.j one computer can be assigned. However, the variant of dividing real processors into virtual ones and assigning these virtual processors to the individual logical control nodes N.i.j, which are then also virtual, is the most advantageous from the perspective of further streamlining the calculation with the same total computing power.

Typically, this division is implemented so that at least one real processor is divided into two or more virtual processors, whereas each virtual processor created by this division has at least one core and the number of cores of the divided real processor is equal to the sum of the number of the cores of the virtual processors created from this real processor.

Method for balancing energy management over time is based on the performance of the following steps:
  a) selecting at least three connection points S.k so that at least one of them comprises an energy production source and that at least one of them comprises an energy consuming appliance, dividing these connection points S.k into at least two groups, and connecting all these connection points S.k to the distribution network;
  b) equipping the computing center with at least one processor, wherein all the computing center processors have in total at least three cores and at least one of the computing center processors has at least two cores;
  c) dividing the at least one real processor in the computing center which has at least two cores into at least two virtual processors, each having has at least one core;
  d) determining the number of logical control nodes N.i.j, wherein this number is greater than or equal to 3 and is less than or equal the sum of the number of cores of all processors in the computing center, and determining the number m of levels of logical control nodes N.i.j, wherein m$>=$2;
  e) assigning one real or one virtual processor to each logical control node (N, i, j);
  f) for each group of connection points (S.k), a step of logical interconnecting of connection points S.k from this group with one of the logical control nodes N.m.j of the highest level m so that the connection points S.k from each group of connection points are logically interconnected to other control node of the highest level m than the connection points S.k included in other groups;
  g) logically interconnecting the logical control nodes implemented as real or virtual processors from the highest level m to the central logical control node N.1.1 of level 1 so that each logical control node of a higher level is connected to one of nodes of a level lower by one, whereas steps a) to g) are performed in such manner that in the logical interconnection between the logical control nodes N.2.j of the second level and the connection points S.k at least one branching with at least two branches exists.

The determination of the numbers in step d) can be performed, for example, by the system administrator or a superordinate higher control center.

The energy balance is calculated after performing step g) so that the following steps are performed:
  h1) at any time prior to the following steps h2) to h3) or at any time during their carrying out, determining or adjusting the measuring intervals and calculation intervals and determining or adjusting the maximum permitted total energy balance for the set of all selected connection points S, where the energy balance means the difference between the produced energy and the sum of energy consumed and energy stored for the specified calculation interval;
  h2) measuring energy management at the level of each connection point S.k, where this measurement comprises the determination of the current consumption and/or production and/or energy storage and/or energy storage status within the connection point S.k and is performed continuously or at specified measurement intervals, and the calculation of the total energy balance at the specified calculation intervals gradually from the highest level m of logical control nodes to the central logical control node N.1.1, so that firstly, for each logical control node N.m.j of the highest level m, the total energy balance of the connection points S.k logically connected to that node is calculated on the basis of the measured data on energy management for these connection points, and subsequently, for each level i of the logical control nodes N.i.j from the second highest m−1 level down to the lowest first level, in each level i for each logical control node N.i.j of this level, the total energy balance is calculated for logical control nodes of the next higher level i+1 which are logically connected to this node of lower level I;
  h3) verifying whether the total energy balance calculated in step f) for the central logical control node N.1.1 is negative:
    if yes, verifying whether any energy production sources are operating in a dampened mode in the connection points S, if yes, the computing center issues an instruction to increase the power of at least one of them, after which steps h2) and h3) are repeated, if not, the computing center issues an instruction to draw energy from the distribution network, after which steps h2) and h3) are repeated;
    if not, performing verification if it is lower than or equal to the maximum permitted total energy balance, if yes, steps h2) and h3) are repeated, if not, the computing center issues an instruction to dampen production in at least one of the energy production sources and then steps h2) and h3) are repeated.

Figure 3:
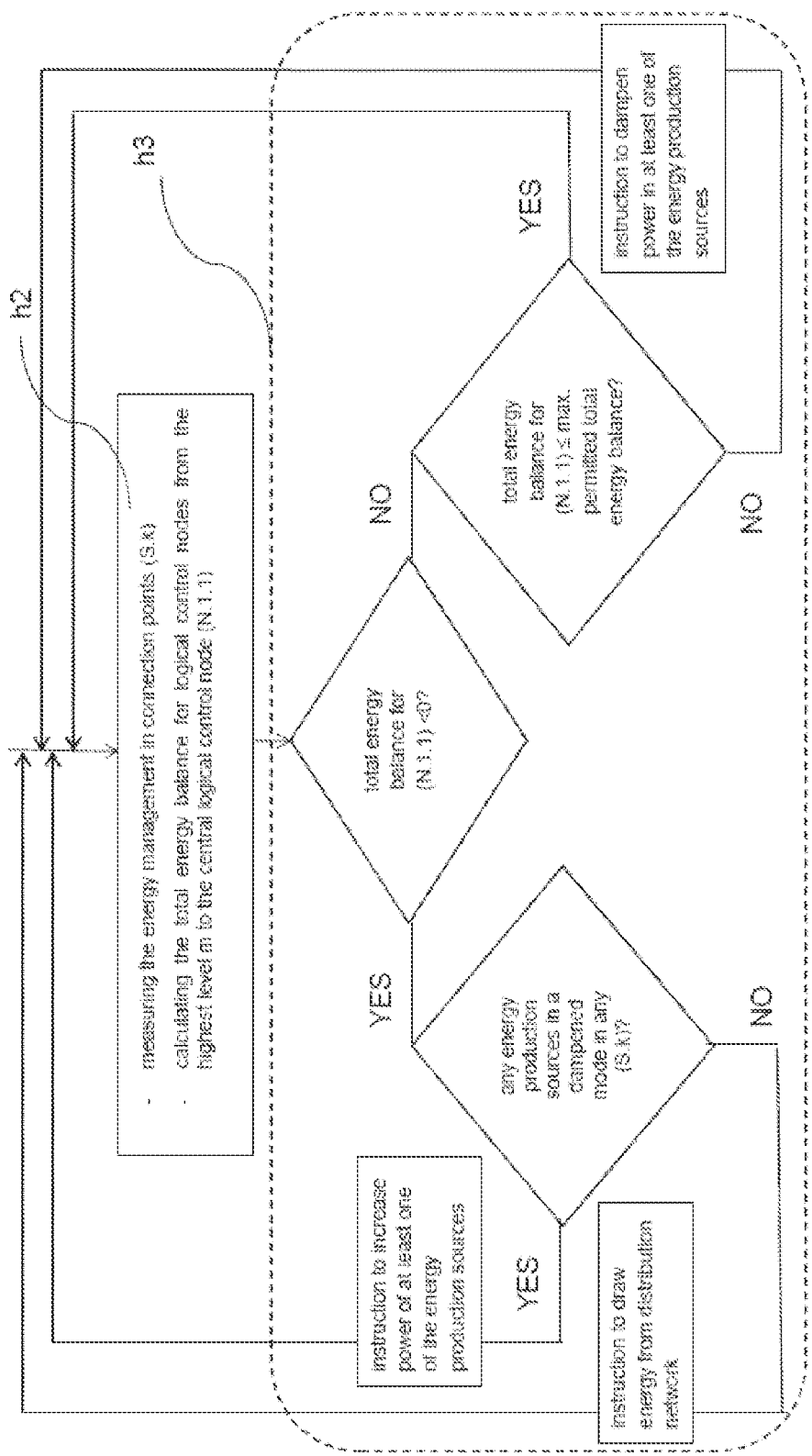
FIG. 3 is a flow chart explaining steps h2) and h3) of the proposed method.

Steps h2) and h3) are graphically illustrated in the flowchart in FIG. 3. Step h3) comprises several decision blocks and also instruction blocks, these blocks belonging to step h3) are thus they are symbolically delineated in FIG. 3 by a dashed shape.

The calculation and measurement intervals as well as the maximum permitted total energy balance can be determined, for example, by the system administrator or the superordinate control center. The calculation intervals are preferably set to less than or equal to 1 s.

In carrying out this method, the computing center is usually equipped with real processors so that the number of these processors is greater than or equal to the number of logical control nodes N.i.j and/or at least one of the real processors is divided into at least two virtual processors so that the sum of the number of the virtual processors and of the number of the real processors not divided into virtual ones is greater than or equal to the number of logical control nodes N.i.j, thereupon to each of the logical control nodes N.i.j one of the virtual or real processors is assigned and the logical interconnection between the logical control nodes N.i.j in step g) is performed as a logical interconnection between the individual processors assigned to these logical control nodes N.i.j.

When creating a logical connection for each level i of the logical control nodes, based on the computing power of those processors to which the logical control nodes N.i.j of this level i are assigned, the maximum allowed number of logical interconnections $Nmax_i$ is determined, oriented upwards from each logical control the node of N.i.j of this level as well as to the elements of the next higher level. The elements of the next higher level at the same time include the logical control nodes for levels 1 to m−1 and for level m the elements of the next higher level include the connection points S.k.

In one of the current possible embodiments, for approximately 100 connection points, one virtual processor, i.e. $Nmax_m=100$ is proposed. With the current trend of increasing the computing power of processors, it can be expected that the number of connection points per virtual processor will increase. Similarly, with the further development of hardware, the maximum allowed number of logical interconnections $Nmax_i$ will probably increase.

When performing step a), after dividing the connection points S.k into groups, it is verified whether the number of connection points in any group is greater than the maximum allowed number $Nmax_m$ of upward oriented logical interconnections for the logical control nodes of the highest of level m of and if yes, the distribution of connection points S.k into groups is changed or additional logical control nodes and/or levels are added so that the condition for maximum allowed number $Nmax_i$ of logical interconnections oriented upwards from one logical control node in each level and also nodes is fulfilled. Each of the added logical control nodes is concurrently assigned one virtual or real processor, that has not yet been assigned any logical control node, and if the number of such virtual or real processors in the computing center is not sufficient, they are supplemented by adding real processors to the computing center and/or by dividing the real processors into virtual processors.

FIGS. 2a to 2d depict one of the possible ways of such logical interconnection of logical control nodes N.i.j and connection points S.k. The procedure of this interconnection may also be dynamic, i.e. firstly a lower number of connection points is connected, then more are connected and as the number of connection points increases, it is appropriate to add other logical control nodes to speed up the calculation, which usually involves adding or connecting additional real processors and/or dividing additional real processors into virtual processors.

Figure 2A:
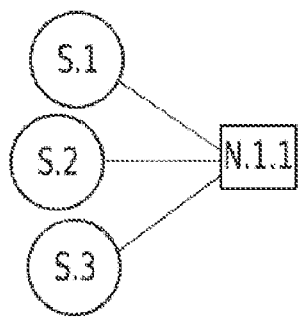
FIGS. 2a to 2d depict one of the possible procedures for the logical interconnection of the logical control nodes and connection points, this being demonstrated on a small number of logical control nodes and connection points for better clarity. The measuring devices A.k, which are part of the connection points S.k are also omitted from the figures for simplicity.

FIG. 2a depicts one of the possible initial situations for a small number of connection points (here only three, S.1 to S.3). In this situation, it is not yet necessary to speed up the calculation of the energy balance, so this connection corresponds to what is known from the background art. The maximum allowed number $Nmax_i$ of logical interconnections oriented from one logical control node of level i upwards to the higher level elements was set uniformly for all levels at $Nmax_i<=3$ for all i, but in general this maximum permitted number can be different for each level. All three connections in FIG. 2a are therefore in one group and are logically connected to the central control node N.1.1.

Figure 2B:
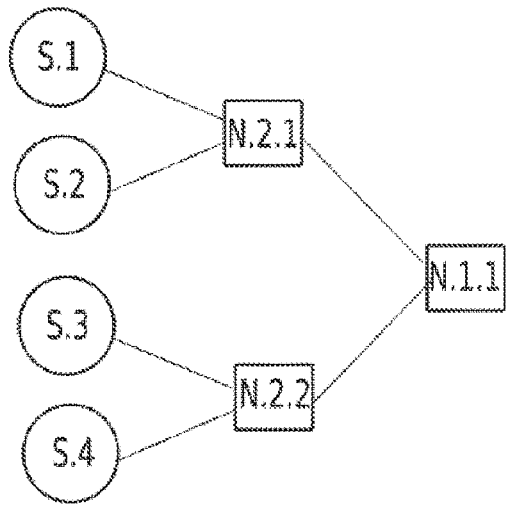

The next step is depicted in FIG. 2b. A fourth connection point S.4 was added; if it were connected to the central control node N.1.1., the condition $Nmax_i<=3$ would not be fulfilled, because four branches instead of three would come out of the central control node. It is therefore necessary to insert another level of control nodes, in the given example 2 nodes of the 2nd level N.2.1, N.2.2 will suffice, divide the connection points into two groups and connect one of the groups to node N.2.1, the second group to node N.2.2.

Figure 2C:
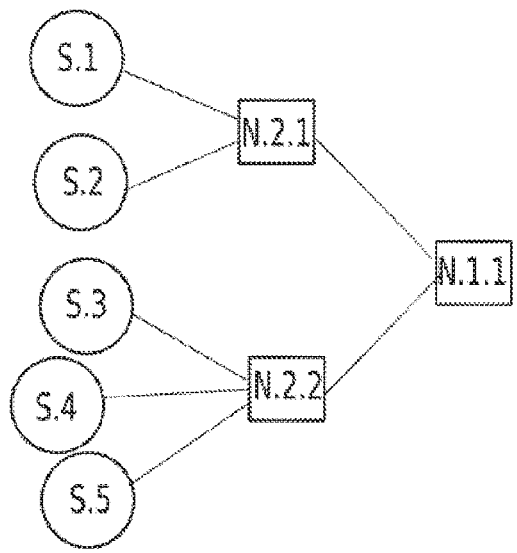

After adding the fifth connection point S.5 in FIG. 2c, the condition $Nmax_i<=3$ is still fulfilled, so there is no need to add logical control nodes or change the division of connection points into groups.

Figure 2D:
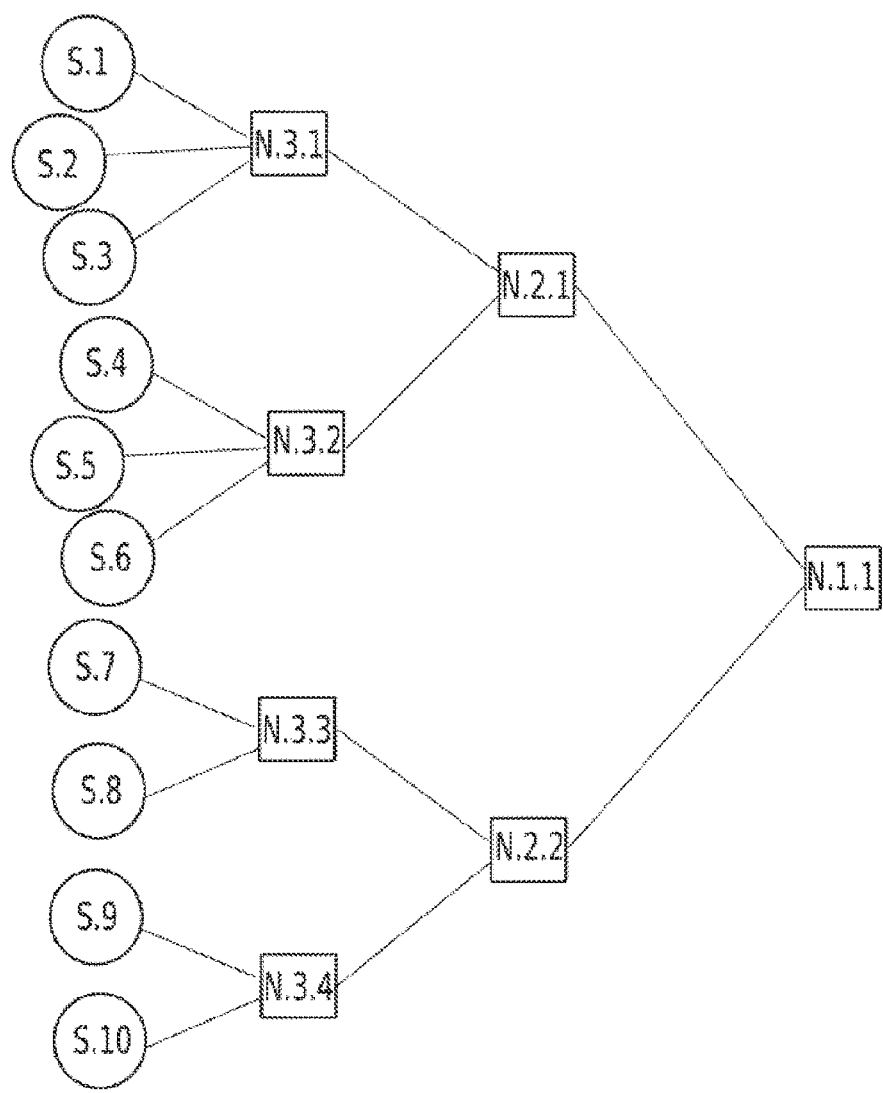

However, in FIG. 2d with ten connection points, to meet the condition $Nmax_i<=3$, it is already necessary to add a third level of logical control nodes.

In general, it is suitable for the network of logical interconnections to branch more towards the higher levels, e.g. in FIG. 2d only two branches emerge from the central control node, but at the third highest level of the logical control nodes already minimum two but mostly three branches emerge from each of the logical control nodes towards the connection points S.k, representing here elements of a higher level.

It is advantageous if the area in which the connection points S.k are located is divided into geographical zones and the division of the connection points S.k into groups in step a) is performed so that each group of connection points comprises the connection points located in one geographical zone.

It is also possible to change, for example, the division of connection points into groups or the way of interconnecting of logical control nodes or their number during the operation of the network according to the current state of the energy balance and thus change the entire circuit. This may occur, for example, in a situation where in some group of connection points there is deficiency of energy during some time period and in another, on the contrary, energy is in oversupply over the similar time period. Or when one geographical zone is constituted in such way that the costs of energy transmission are disproportionately high and could be reduced by reconnecting some locations from that zone to another zone.

The system can also use the prediction of production and consumption, e.g. according to meteorological data, day or nighttime, etc. Similarly, it can also use data on the history of connection points S.k. For new connection points S.k without history, the level of production and consumption at the given consumption point is predicted as a function of time on the basis of input information, e.g. filling out a form and/or an energy performance certificate for a building. This data is corrected during operation according to the connection point statistics. Also, the prediction and/or history described above can be used to redistribute connection points S.k into groups and thus to change their connection to logical control nodes.

INDUSTRIAL APPLICABILITY

Circuit and method according to the present invention can be applied wherever it is appropriate to maintain a balance between energy production on the one hand and its consumption and storage on the other hand. Maintaining virtually zero energy balance essentially continuously is possible owing to the efficient use of computing power, which allows very short computing intervals. The present circuit and method are advantageously applied, for example, in the following cases:

1) Local distribution network (LDN):

This is a site with several supply points (e.g. family houses), connected to one transformer station and through it to a superordinate, usually larger distribution network. (DN).

These family houses represent connection points S.k and are equipped with measuring devices A.k, that are data-interconnected to the computing center. The proposed circuit and method regulate the individual connection points S.k from the perspective of oversupply or insufficiency of electric energy/capacity of the local battery storage. The result is the optimization of electricity production and consumption at the level of the connection point to a larger distribution network so that the total energy balance is almost zero already at the level of the point of connection to the larger distribution network.

2) Production area:

The principle is the same as for LDN and family houses, and similar, considering the fact that the proposed circuit and method can help to save considerable costs for the production area in providing peak shaving (exceeding the contracted quarter-hour maximum), this is the prevention of exceedance of permitted power supply using the energy in battery storage and optimizing the production and consumption in the production area among the individual operations.

3) Use for larger distribution networks (DN):

Load relief of electrical loading on DN, especially in fields such as gas, water, oil industry, telecommunications systems, railways, etc. The invention can be used, for example, for product pipelines (gas pipelines, water mains), it is suitable for securing energy safety in the operation of gas distribution stations, piping shafts of product pipelines, water supply facilities, but also of telecommunication facilities, etc.

The invention claimed is:

1. A circuit for balancing energy management over time comprising a computing center and at least three connection points (S.k) where energy is managed, k being a sequential number of the connection point, wherein each of these connection points (S.k) is equipped with a measuring device (A.k) for energy management data measurement over time, the measuring device (A.k) being data-connected to the computing center comprising at least one processor, wherein at least one of the connection points (S.k) includes an energy production source and wherein at least one of the connection points (S.k) comprises an energy consuming appliance, wherein all the connection points (S.k) are also power-connected to a distribution network, wherein the circuit comprises at least three logical control nodes (N.i.j) which are arranged in a logically interconnected tree structure in which they are divided into at least two levels, the levels being numbered by first sequential numbers i from 1 to m, m being the total number of levels, whereas in the frame of the same level with the same first sequential number i, the logical control nodes (N.i.j) are numbered by a second sequential number j, and the logically interconnected tree structure is arranged so that in the lowest first level, there is one central logical control node (N.1.1), from which the tree structure branches to higher levels, wherein the first sequential number indicating the level increases in the direction from of this central control node (N.1.1), and wherein each logical control node (N.m.j) of the highest m-th level is logically connected to at least one of the connection points (S.k), the logical connection structure comprising at least one branching with at least two branches between the logical control nodes (N.2.j) of the second level and the connection points (S.k), characterized in that each logical control node (N.i.j) is a part of the computing center and that there is at least one real processor among the computing center processors having at least two cores and which is divided into at least two virtual processors, each having at least one core, wherein the sum of the number of the real processors not divided into virtual ones and of the number of the virtual processors is equal to or greater than the total number of all logical control nodes (N.i.j) of all levels, each of these logical control nodes (N.i.j) being assigned one of these virtual or real processors, and the logical interconnection between the logical control nodes (N.i.j) is implemented as a logical interconnection between the individual processors assigned to these logical control nodes (N.i.j).

2. The circuit according to claim 1, characterized in that for at least one real processor which is divided into two or more virtual processors, the number of cores of the divided real processor is equal to the sum of the number of cores of the virtual processors created from this real processor.

3. The circuit according to claim 1, characterized in that from each logical control node (N.i.j) of levels from 1 to m−1 emerge at least two branches of logical interconnection towards the logical control nodes of the next higher level and that also from each logical control node of the highest level m emerge at least two branches of logical interconnection towards the connection points (S.k).

4. The circuit according to claim 1, characterized in that the number of connection points (S.k) is greater than the number of logical control nodes (N.m.j) of the highest m-th level and the connection points (S.k) are divided into groups according to geographical zones and/or the character of energy management so that the number of these groups of connection points (S.k) corresponds to the number of logical control nodes (N.m.j) of the highest m-th level, and to each group of connection points (S.k) is assigned one logical control node (N.m.j) of the highest m-th level to which the connection points (S.k) of the given group are logically connected.

5. The circuit according to claim 1, characterized in that the measuring device (A.k) of at least one of the connection points (S.k) is connected to the computing center via Internet.

6. The circuit according to claim 1, characterized in that each connection point (S.k) comprises at least one energy production source and/or at least one energy consuming appliance and/or at least one energy storage system.

7. A method for balancing energy management over time comprising the following steps:
   a) selecting at least three connection points (S.k) so that at least one of them comprises an energy production source and that at least one of them comprises an energy consuming appliance, dividing these connection points (S.k) into at least two groups and connecting all these connection points (S.k) to distribution network;
   b) equipping the computing center with at least one processor, wherein all the computing center processors have in total at least three cores and at least one of the computing center processors has at least two cores;
and characterized in that it further comprises the following steps:
   c) dividing at least one real processor in the computing center having at least two cores into at least two virtual processors, each of which has at least one core;
   d) determining the number of logical control nodes (N.i.j), this number being greater than or equal to 3 and is less than or equal to the sum of the cores of all processors in the computing center, and determining the number m of levels of logical control nodes (N.i.j), this number m of levels being greater than or equal to 2;
   e) assigning one real or one virtual processor to each logical control node (N.i.j);
   f) for each group of connection points (S.k) the step of logically interconnecting the connection points (S.k) from this group to one of the logical control nodes (N.m.j) of the highest level m so that the connection points (S.k) from each group of connection points are logically interconnected to other control node of the highest level m than the connection points (S.k) placed in the other groups;

g) logically interconnecting the logical control nodes implemented as real or virtual processors from the highest level m to the central logical control node (N.1.1) of level 1 in such way that each logical control node of a higher level is connected to one of the nodes of a level lower by one, steps a) to g) being performed in such manner, that in the logical interconnection between the logical control nodes (N.2.j) of the second level and the connection points (S.k), at least one branching with at least two branches is present.

8. The method according to claim 7, characterized in that for each level i of logical control nodes, based on the computing power of those processors assigned to the logical control nodes (N.i.j) of this level i, a determination is performed of the maximum allowed number of logical connections $Nmax_i$ oriented upwards from each logical control node (N.i.j) of this level i to elements of next higher level, wherein the elements of the next higher level comprise for levels 1 to m−1 the logical control nodes, and wherein for level m the elements of the next higher level comprise connection points (S.k), wherein when performing step a), after dividing the connection points (S.k) into groups, it is verified whether the number of connection points in any group is greater than the maximum allowed number $Nmax_m$ of upward oriented logical connections for logical control nodes of the highest level m and if yes, the distribution of connection points (S.k) into groups is changed, or additional logical control nodes and/or levels are added, so that the condition for the maximum allowed number $Nmax_i$ of logical interconnections oriented upwards from one logical control node at each level i of nodes is fulfilled, each of the added logical control nodes being assigned one virtual or real processor not yet assigned to any logical control node, wherein if the number of such virtual or real processors in the computing center is not sufficient, they are supplemented by adding real processors to the computing center and/or by dividing real processors into virtual processors.

9. The method according to claim 7, characterized in that after performing step g) the following steps are performed:
   h1) at any time prior to the following steps h2) to h3) or at any time during their carrying out, determining or adjusting measuring intervals and calculation intervals and determining or adjusting maximum permitted total energy balance for the set of all selected connection points (S.k), wherein the energy balance means the difference between the produced energy and the sum of energy consumed and of energy stored for the specified calculation interval;
   h2) measuring energy management at the level of each connection point (S.k), wherein this measuring comprises determining current level of consumption and/or of production and/or of energy storage and/or determining the status of the energy storage system within the connection point (S.k), and is performed continuously or at specified measurement intervals, and calculating the total energy balance at the predetermined calculation intervals gradually from the highest level m of logical control nodes to the central logical control node (N.1.1), so that firstly, for each logical control node (N.m.j) of the highest level m, the total energy balance of the connection points (S.k) logically connected to it is calculated on the basis of the measured data on energy management for these connection points, and subsequently for each level i of the logical control nodes (N.i.j) from the second highest m−1 level down to the lowest first level, in each level i for each logical control node (N, i, j) of this level i the total energy balance is calculated for logical control nodes of the next higher level i+1, which are logically connected to this node of lower level i;
   h3) verifying whether the total energy balance calculated in step h2) for the central logical control node (N.1.1) is negative:
   if yes, verifying whether any energy production sources are operating in a dampened mode in the connection points (S.k):
      if yes, the computing center issues an instruction to increase the power of at least one of these energy production sources, after which steps h2) and h3) are repeated;
      if not, the computing center issues an instruction to draw energy from the distribution network, after which steps h2) and h3) are repeated;
   if not, verifying whether it is lower than or equal to the maximum permitted total energy balance:
      if yes, steps h2) and h3) are repeated;
      if not, the computing center issues an instruction to dampen production in at least one of the energy production sources and then steps h2) and h3) are repeated.

10. The method according to claim 9, characterized in that the calculation intervals are set to be shorter than or equal to 1 s.

11. The method according to claim 7, characterized in that the area in which the connection points (S.k) are located is divided into geographical zones and the division of the connection points (S.k) into groups in step a) is performed in such manner, that each group of connection points comprises the connection points located in one geographical zone.

* * * * *